(12) United States Patent
Heemstra

(10) Patent No.: US 10,544,919 B2
(45) Date of Patent: Jan. 28, 2020

(54) OPTICAL ARRANGEMENT, LIGHTING SYSTEM AND ILLUMINATION METHOD

(71) Applicant: SIGNIFY HOLDING B.V., Eindhoven (NL)

(72) Inventor: Tewe Hiepke Heemstra, Veldhoven (NL)

(73) Assignee: SIGNIFY HOLDING B.V, Eindhoven (NL)

( * ) Notice: Subject to any disclaimer, the term of this patent is extended or adjusted under 35 U.S.C. 154(b) by 0 days.

(21) Appl. No.: 16/331,556

(22) PCT Filed: Sep. 19, 2017

(86) PCT No.: PCT/EP2017/073663
§ 371 (c)(1),
(2) Date: Mar. 8, 2019

(87) PCT Pub. No.: WO2018/054913
PCT Pub. Date: Mar. 29, 2018

(65) Prior Publication Data
US 2019/0203909 A1    Jul. 4, 2019

(30) Foreign Application Priority Data

Sep. 22, 2016    (EP) .................................... 16190046

(51) Int. Cl.
| F21V 14/04 | (2006.01) |
| F21V 14/06 | (2006.01) |
| F21V 7/00  | (2006.01) |
| F21V 13/04 | (2006.01) |
| F21Y 115/10 | (2016.01) |

(52) U.S. Cl.
CPC ............ *F21V 7/0008* (2013.01); *F21V 13/04* (2013.01); *F21V 14/04* (2013.01); *F21V 14/06* (2013.01); *F21Y 2115/10* (2016.08)

(58) Field of Classification Search
CPC ......... F21V 7/0008; F21V 14/04; F21V 14/06
USPC ....................................................... 362/277
See application file for complete search history.

(56) References Cited

U.S. PATENT DOCUMENTS

| 7,275,840 B2 | 10/2007 | Holten |
| 8,262,252 B2 | 9/2012 | Bergman et al. |
| 8,651,694 B2 | 2/2014 | Becker et al. |
| 9,010,945 B2 | 4/2015 | Vasylyev |
| 2006/0203468 A1* | 9/2006 | Beeson ................ G02B 27/286 362/84 |

(Continued)

FOREIGN PATENT DOCUMENTS

| CN | 200965193 Y | 10/2007 |
| DE | 102004026160 A1 | 12/2005 |

(Continued)

*Primary Examiner* — Christopher M Raabe
(74) *Attorney, Agent, or Firm* — Daniel J. Piotrowski

(57) ABSTRACT

An optical arrangement for illuminating a region within a space comprises a reflector array and lens array having adjustable relative displacement. Each lens of the lens array is arranged to receive light from a first location within the space and to direct it onto one of the reflectors of the reflector array. Each lens is further configured to receive light reflected back from the reflector array and redirect it toward a second location within the space. By adjusting the relative displacement between the two arrays, the position of the second location can be configured.

14 Claims, 3 Drawing Sheets

(56) References Cited

U.S. PATENT DOCUMENTS

| | | | |
|---|---|---|---|
| 2007/0086211 A1* | 4/2007 | Beeson | G02F 1/133603 362/628 |
| 2010/0020538 A1* | 1/2010 | Schulz | F21V 7/0008 362/235 |
| 2012/0113620 A1* | 5/2012 | Ho | G02B 6/0021 362/97.1 |
| 2015/0211708 A1 | 7/2015 | Stavely et al. | |
| 2016/0252237 A1* | 9/2016 | Brown | B23K 26/0643 362/259 |
| 2018/0087748 A1* | 3/2018 | Gladden | F21V 17/02 |

FOREIGN PATENT DOCUMENTS

| | | |
|---|---|---|
| EP | 0735311 A1 | 10/1996 |
| EP | 1709360 A1 | 10/2006 |
| EP | 2711773 A2 | 3/2014 |
| WO | 0058771 A1 | 10/2000 |
| WO | 2009007927 A1 | 1/2009 |
| WO | 2013102861 A1 | 7/2013 |
| WO | 2014036509 A1 | 3/2014 |

* cited by examiner

OPTICAL ARRANGEMENT, LIGHTING SYSTEM AND ILLUMINATION METHOD

CROSS-REFERENCE TO PRIOR APPLICATIONS

This application is the U.S. National Phase application under 35 U.S.C. § 371 of International Application No. PCT/EP2017/073663, filed on Sep. 19, 2017, which claims the benefit of European Patent Application No. 16190046.9, filed on Sep. 22, 2016. These applications are hereby incorporated by reference herein.

FIELD OF THE INVENTION

This invention relates to an optical arrangement and lighting system for illuminating a region within a space, and in particular, for illuminating a region by means of reflection of a remotely positioned illumination source.

BACKGROUND OF THE INVENTION

Office lighting is most commonly provided by means of ceiling 'troffers', which are (typically rectangular) light fixtures designed to accommodate fluorescent or LED light sources, and configured to fit into a modular dropped ceiling grid. Troffers typically comprise reflective and/or diffusive optical components to modulate direction or character of emitted light.

One disadvantage of troffer-based lighting solutions is that light is typically distributed uniformly across an illuminated space, leading to much wasted light, where light is directed to areas or regions within the space (for example in between desks or workstations in an office) where illumination is not required (at least at the same intensity).

Additionally, in the case of illumination within an office for instance, the level or intensity of the light provided to each desk or workstation cannot be independently controlled, since light is distributed in a uniform, non-discriminatory way across all regions within the illuminated space. Independent control of lighting for different regions in a space would be useful in many cases, for example to enable temporary increase of light level for older or sight-impaired workers or users, while keeping light level relatively lower for other workers/users. Locally increased light (temporary or otherwise) might also be of advantage for performing precision tasks for instance, or it may be useful to change light level lower when performing screen-based tasks (to avoid glare) and higher when performing paper-based tasks.

Currently known troffer-based lighting systems are also typically expensive to install (due to the requirement to run electronic cabling to across the ceiling to each troffer) and require relatively high levels of maintenance (fixing broken lamps/sensors, changing commissioning settings, fixing commissioning errors). As mentioned above, known troffer systems do not enable local tailoring of illumination characteristics, such as brightness, colour, directionality or for implementing individual timing or scheduling (such as to fit with individual circadian rhythms).

As an alternative to troffer-based lighting systems, it is known to use ground-based light sources, configured to project upwards onto the ceiling. This creates a bright spot on the ceiling, whose reflection then illuminates the space directly beneath. Ground-based illumination such as this provides far greater flexibility in terms of changing local light levels and characteristics. Light can be provided in a highly localised manner, with each workstation or desk for instance provided with an individual ground-based light source, which can be individually adjusted.

However, for efficiency, such systems typically require the ceiling to be either painted white, or to be fitted with a dedicated reflector panel. A white ceiling leads to light being spread in unwanted directions, and therefore wasted.

A reflector panel is known from EP-2711773. The known reflector panel comprises an array of micromechanical reflectors that are disposed to selectively direct portions of light from a light source to a selected target, wherein the array of reflectors is continuously steerable. The known reflector panel is suitable for providing composed illumination for still or video photography, and it may be integrated with a compact camera into a cellular telephone, a tablet computer, a laptop computer, a digital still-image camera, or a digital video-image camera.

However, as alternative for ceiling-based lighting such as a troffer-based lighting system, the known reflector panels offer very limited degree of control over the directionality of the reflected light. To achieve illumination at a particular location, the ground-based light sources must be fixed at a precise relative location, in order to achieve the required reflection angle. Often, this is not practical, due to constraints imposed by the layout of the office (or other space), and hence light is typically cast onto areas or regions which are not precisely congruous with workstation locations. This limits possibilities for individualised control of provided lighting.

There is a need therefore for a lighting system and associated apparatus capable of providing improved control over the directionality of illumination.

SUMMARY OF THE INVENTION

The invention is defined by the claims.

According to an aspect of the invention, there is provided an optical arrangement for illuminating a region in a space, comprising:

a lens array comprising a plurality of lenses;

a reflector array comprising a plurality of reflector elements;

wherein each lens is arranged to direct light originating from a light source at a first location within said space onto one of said reflector elements, and each reflector element is arranged to reflect received light back onto the same lens from which it was received for redirection toward a different second location within said space, and wherein at least one of the lens array and the reflector array has an adjustable position so as to configure said second location.

The invention hence provides a reflector panel type solution for enabling re-direction for ground-based lighting to a specific tailored location within a space. Control over directionality is achieved through provision of a reflector array and lens array pair having an adjustable relative displacement. By controlling this relative displacement, an optical interaction between the two arrays is changed, thereby varying an angle of deviation between incoming light received at the optical arrangement and outgoing light departing from the optical arrangement. In this way, control over the directionality of illumination can be achieved.

The position of the lens array and/or the reflector array may be manually adjustable (i.e. by hand) or may be mechatronically controllable (i.e. by means of a motor or actuator component).

The term 'array' may refer to a regular arrangement having a uniform pitch between neighbouring elements (either reflectors or lenses). In examples, a pitch of the lens array may be equal to a pitch of the reflector array. In this way, the optical arrangement may be configured such that each lens is provided optically coupled with a respective single reflector element. Each lens is arranged to direct light onto a respective one of the reflector elements, and to receive light from the same one of the reflector elements.

The term 'light source' may refer to any device that is capable of emitting light, such as an incandescent light source, an electric discharge light source, and an electroluminescent light source (for example a LED- or a laser-based light source).

Further to the above, each of the plurality of reflector elements has a first surface portion and a second surface portion arranged such that light incident on the first surface portion from one of the lenses is reflected towards the second surface portion, with the second surface portion arranged to reflect the light received from the first surface portion towards said same lens from which the first surface portion received the light.

In examples complying with the previous paragraph, reflection from the reflector element back to the lens element involves at least one process of reflection between surfaces of the reflector element itself. Light is therefore in these examples not directly reflected by the reflector element, but rather indirectly reflected, via a secondary reflection occurring within the reflector element itself. This may for example help facilitate the return of light to the same lens from which it was received, since the light may be steered, via the second surface portion, back in the direction of the lens from which it was received.

Additionally or alternatively, one or more of the reflector elements is adapted to reflect incident light in a direction parallel but non-coincident with a direction of incidence.

In examples complying with the previous paragraph, light is reflected by said one or more of the reflector elements along a path parallel with the incident light path, but laterally translated or shifted. In this way, light returned from the reflector array falls incident at the lens array at a point laterally shifted with respect to that through which it exited. This translational shift between the exit point and re-entry point of light from and to the reflector array gives rise to the shift in directionality between incoming and outgoing light to and from the optical apparatus as a whole. It is this optical mechanism which hence enables the directionality of outgoing light to be configured and controlled.

In particular examples, each of the plurality of lens elements may be adapted to converge received light toward one of the reflector elements. The lens elements may be converging lenses. Converging lenses have the property that light incident at the lens in a collimated beam is focussed to a point in the focal plane of the lens. Light incident at one of the lenses from a location within the space may be assumed approximately collimated, and may hence be focussed to a point on a focal plane proximal to at least one of the reflectors. Light returning along a parallel but spatially translated path effectively returns to the lens from a different point within said focal plane, and hence exits the lens in an approximately collimated beam travelling in a direction different from the direction of arrival at the optical arrangement.

In accordance with one or more examples, each of the lens array and the reflector array may have an adjustable position, and wherein each is adjustable by means of movement in a respectively different direction. One may be moveable along a first direction in order to adjust its position, and the other moveable along a second, different direction. By direction may be meant direction vector, where these may refer to Cartesian direction vectors (i.e. x, y z directions) or direction vectors from a different co-ordinate system, such as polar (radial, azimuthal directions), spherical (radial, azimuthal, polar directions) or cylindrical (radial, azimuthal, z directions) co-ordinate systems.

In more particular examples, the two arrays may be moveable in respectively different and orthogonal directions. This may simplify the adjustment mechanism, since two directions of adjustment of the relative positioning of the arrays may be achieved but wherein each array need only be adapted to move along a single vector direction.

More particularly still, where the lens array describes a plane, the lens array and reflector array may each be adjustable in a different orthogonal direction parallel with said plane. In this way, relative adjustment of the displacement between the arrays may be achieved in any particular direction lying in the plane defined by said two orthogonal directions. This helps maximise freedom of adjustment in relative positioning of the arrays, and hence helps maximise the degree of control over the position of said second location in the space (to which light is directed).

In descriptions which follow, directions falling within (i.e. parallel with) said plane parallel with the lens array may be referred to as 'lateral' directions.

In accordance with one or more examples, where the lens array describes a plane, one of the lens array and reflector array may be adjustable in a direction perpendicular to said plane. Perpendicular adjustment may enable a focus of the light outwardly transmitted from the optical arrangement to be adjusted, and may enable the quality or sharpness of the projected beam spot to be improved or enhanced.

In at least a subset of embodiments, the lens array may be an integrally formed optical body. It may be manufactured as a single piece, i.e. a single optical element. By providing a lens array which is an integrally formed optical body, assembly of the optical arrangement may be rendered simpler and/or the optical arrangement may benefit from improved robustness—both structural robustness and operational robustness (since optical defects or aberrations caused by joins or gaps between individual lenses may be avoided or mitigated).

In further examples, the lens array may be constructed by means of assembling and connecting together the plural lenses populating the array such that all elements are contiguously or non-contiguously joined to form a substantially unitary optical body. The plural lenses may each be joined by an optical material for example. They may be joined such that there are no open spaces or gaps between them.

In accordance with one or more examples, the reflector elements may be corner reflectors.

Optionally, the reflector elements may be total internal reflection (TIR) based corner reflectors, wherein the array comprises an optically transmissive body having cube shapes positioned or formed within it, aligned along a distal (with respect to the lens array) wall or edge.

The reflector array, in accordance with one or more examples, may be an integrally formed body and may in particular comprise at least one of: a metallic mirror, a dielectric mirror, and a TIR-based mirror. By TIR-based mirror is meant a component configured to reflect incident light based on principles of total internal reflection.

According to at least a subset of embodiments, the optical arrangement may further comprise a motor mechanism for driving adjustment of the position of at least one of the lens array and the reflector array. The motor mechanism may include a mechatronic type motor or may include any form of actuator or mechanised movement means in which electrical energy is converted into mechanical (kinetic and/or potential) energy for use in manipulating the position of one or both of the arrays.

Motorised adjustment may render adjustment simpler or easier. It may enable adjustment of the second location within the space to be adjusted remotely from the optical arrangement, therefore obviating the need to gain close access to the apparatus in order to configure it. This is beneficial where it is desired to configure the directional settings of the optical arrangement after installation has been performed. The motor mechanism may also enable automated or systematised adjustment to be performed (i.e. adjustment performed by means of software as opposed to by direct human control).

In examples, the arrangement may comprise a power harvesting unit for providing electrical power to said motor mechanism. The power harvesting unit may be a solar harvesting unit comprising one or more solar cells for harvesting electrical energy from incident light. It may be an NFC-based power harvesting unit, adapted to convert NFC wireless signals into useable electrical energy. It may harvest electric, magnetic, or electromagnetic (RF) fields, air pressure changes (either environmental or acoustic), temperature changes and/or harvest any other form of energy flow. The power harvesting unit may comprise a re-chargeable battery and/or a capacitor or super-capacitor for storing electrical energy for later use in powering the motor mechanism. The battery, capacitor or super-capacitor may be charged by means of a power harvesting circuit (e.g. solar or NFC harvesting).

These examples may enable motorised adjustment to be performed even in the absence of a mains electrical connection. This may be useful for example in the circumstance of installation, where mains power may not yet be connected or may be deliberately disconnected for reasons of safety. It may in any event be desirable to isolate adjustment circuits from the mains power supply in order for instance to prevent overloading the (typically low-power) motor circuits with the (typically high power) primary mains supply.

Also, absence of any mains connection to the optical arrangement may be desirable for reasons of simplifying the installation process. Since the optical arrangements do not require the presence of integrated light sources (unlike for example traditional troffer-based lighting units), no local power supply is required for driving a source of illumination. Providing a power harvesting unit or battery unit (for driving the motor mechanism) allows provision of a mains supply to be avoided. This obviates the need to run electric cabling to each of the optical arrangements, and hence rendered installation quicker, simpler and cheaper.

Aiming of the outgoing light (to configure said second location within the space) may be performed 'manually', i.e. by directing a remotely positioned light source from the first location onto the optical arrangement and progressively adjusting the relative displacement of the reflector and lens array until the outgoing light is directed toward a desired second location.

Aiming might alternatively be performed 'automatically', i.e. by means of software-directed control. Here, a known first location (of the remotely positioned light source) and a desired second location may be provided as input variables to a controller, and software installed on the controller then configured to adjust the relative positioning of the arrays so as to direct light to said desired second location.

In accordance with one or more examples, the arrangement may comprise an interface unit operatively coupled with said motor mechanism for receiving control commands for configuring adjustment of the lens array and/or the reflector array. The interface unit may be adapted to receive wireless control commands or wired control commands. Control commands may, by means of non-limiting example, be sent by means of standard local area networking protocols, by Bluetooth, by NFC, by ZigBee, by Z-wave or by any other communication protocol or system.

Examples in accordance with a further aspect of the invention provide a lighting system for illuminating a region in a space, comprising:

a luminaire positioned at a first location within the space, adapted to generate a light output; and an optical arrangement in accordance with any of the above-described examples and embodiments, positioned remotely from the luminaire, and arranged to receive said light output and to redirect it toward a second location within the space.

The lighting system enables illumination to be controllably provided to a desired region within a space by controllably adjusting the relative positioning of the lens array and reflector array. Since the output directionality of the optical arrangement can be controllably adjusted, illumination can be provided to a desired location in the space (i.e. a specific worker's/user's desk) while positioning the luminaire at a far wider range of suitably convenient locations.

In examples, the luminaire may comprise a zoom lens for adjusting a focus of the luminous output, for instance a focal point of the luminous output. It may additionally or alternatively change the particular region of the reflector array(s) onto which light is directed. It may also change the total incidence area (of the optical arrangement, lens array or reflector array) over which light is spread. The zoom lens may influence the directional characteristics of the output light, since these characteristics depend to some extent upon the focal status of the light received at the lens array (e.g. the degree to which it is collimated or, on the contrary, is divergent).

Examples in accordance with a third aspect of the invention provide a method of providing illumination to a region within a space, comprising:

directing light from a first location within the space toward a remotely positioned optical arrangement, the arrangement comprising:

a lens array comprising a plurality of lenses;

a reflector array comprising a plurality of reflector elements;

wherein each lens is arranged to direct light received from the first location within said space onto one of said reflector elements, and each reflector element is arranged to reflect received light back onto the same lens from which it was received for re-direction toward a second different location within said space, and wherein at least one of the lens array and the reflector array has an adjustable position;

wherein each of the plurality of reflector elements has a first surface portion and a second surface portion arranged such that light incident on the first surface portion from one of the lenses is reflected towards the second surface portion, with the second surface portion arranged to reflect the light received from the first surface portion towards said same lens from which the first surface portion received the light, and/or wherein one or more of the reflector elements is adapted to reflect incident light in a direction parallel but non-coincident with a direction of incidence;

and the method further comprising:

adjusting the position of the at least one of the lens array and the reflector array so as to configure said second location.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
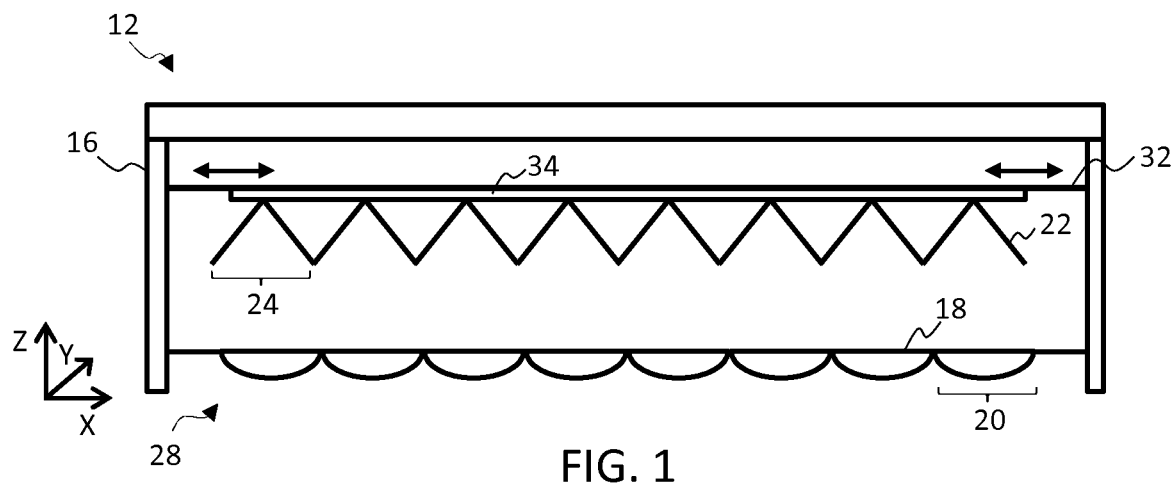
FIG. 1 schematically illustrates a first example optical arrangement in accordance with the invention.

It should be understood that the Figures are merely schematic and are not drawn to scale. It should also be understood that the same reference numerals are used throughout the Figures to indicate the same or similar parts.

The invention provides an optical arrangement for illuminating a region within a space comprising a reflector array and lens array having an adjustable relative displacement. Each lens of the lens array is arranged to receive light from a first location within the space and to direct it onto one of the reflectors of the reflector array. Each lens is further configured to receive light reflected back from the reflector array and redirect it toward a second location within the space. By adjusting the relative displacement between the two arrays, the position of the second location can be configured.

FIG. 1 schematically illustrates a cross-sectional view through a first example optical arrangement 12 in accordance with one or more embodiments of the invention. For ease of description, three arbitrary direction vectors (x, y, z) are defined in the figure. The arrangement comprises a housing 16 within which are mounted a lens array 18, comprising a plurality of lenses 20, and a perpendicularly displaced reflector array 22 comprising a plurality of reflector elements 24. The lens array is positioned extending across an open surface 28 of the housing and acts as a light entry and exit area into and out of the optical arrangement. Each of the lens array and reflector array may form a planar arrangement (i.e. extending in the X-Y plane), and in particular may form parallel planar arrangements.

In the particular example of FIG. 1, the reflector array 20 is slidably mounted to one or more X-aligned rails 32 to, to thereby enable an X-position of the reflector array to be adjusted, allowing a relative lateral displacement between the reflector array and the lens array to be configured. This is further illustrated in FIGS. 2 and 3, which show adjustment of the reflector array to an extreme 'left' X-direction configuration (FIG. 2) and an extreme 'right' X-direction (FIG. 3) configuration.

Figure 2:
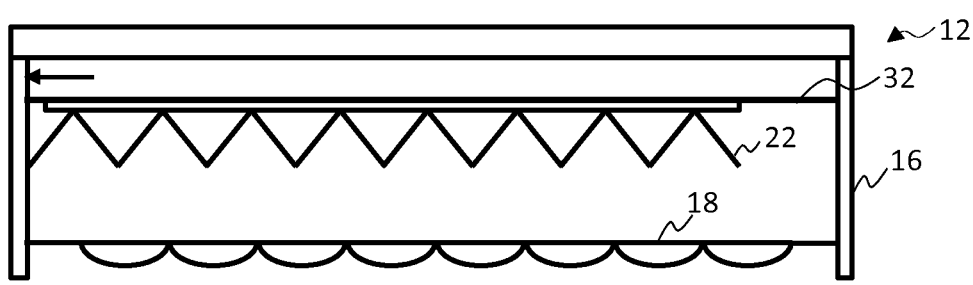
FIG. 2 shows a first adjustment setting of the reflector array of the first example optical arrangement.

As shown in FIG. 2 the scope of lateral adjustment in either direction may span a distance equal to the width of a single lens (or a single reflector element). In this way, adjustment of the reflector array enables each reflector element to be progressively shifted from a position in which it is directly facing just a single lens 20, to a position in which it is facing and covering neighbouring halves of two adjacent lenses. The continuous set of intermediate positions between these two extremes corresponds to a continuous spectrum of different resultant angular directionalities of light output from the optical arrangement.

In further examples, the scope of lateral adjustment may only be a fraction of that illustrated in the example of FIG. 2. Depending, inter alia, upon the numerical aperture of the lenses and the positions of the lens focal points within the reflectors, not all of the light emerging from a lens may fall incident at a reflector element. Additionally, not all light subsequently reflected from a reflector element may necessarily return to the same lens from which it was transmitted. This is called 'vignetting'. As a result, the amount of useful light (light which can ultimately form a part of the light output generated by the optical arrangement and directed to the second location) may decrease at increasing x- and y-excursion. There may be increasing 'lost light' at increasing lateral displacement of the reflector array, which is re-directed to undesired locations and cannot form part of a final luminous output. The 'lost light' may in fact interfere with the final produced luminous output.

This vignetting effect may be mitigated in some examples, although at the cost of some loss of luminous efficiency. For example, one or more diaphragms may be positioned proximal to (for example at the sides of) one or more of the lenses and/or reflector elements so as to block any stray light. The diaphragms may be adapted to absorb stray light for example. A similar effect may be achieved through use of one or more (possibly flexible) black or light absorbing separation walls shaped and positioned so as to surround one or more lens-reflector pairs. Louvre plates or slats (as known from the field of LCD screens, for privacy shielding) might also be considered, wherein these may be positioned in-between lenses and/or reflector elements to block stray light. Any combination of these options might also be contemplated.

In accordance with examples, movement of the reflector array 22 may be driven by means of a further provided motor mechanism (not shown). The motor mechanism may for example drive lateral motion of the reflector array along the one or more rails 32.

The motor mechanism may in examples be powered by a power harvesting unit. The power harvesting unit may for example comprise one or more photovoltaic (or solar) cells to harvest luminous energy, or may comprise for instance an NFC harvesting circuit. In the case of a photovoltaic harvesting unit, the one or more photovoltaic cells may be configured having a light sensitive surface arranged in optical communication with a light source at said first location in the space. A portion of the light received from the first location may hence be harvested and utilised in powering the motor mechanism.

Suitable photovoltaic modules or harvesting units will be readily apparent to the skilled person in the present technical field, and the technical operation of such units, as well as the means for incorporation into embodiments of the present invention, will be well known and well understood.

In the case of an NFC power harvesting unit, the unit may comprise one or more NFC receivers (e.g. antennas) for receiving NFC signals, and may further comprise a power conversion element for converting the NFC electromagnetic signal into an electrical drive current.

In either case, the power harvesting unit may be electrically coupled with the motor mechanism in order to provide the mechanism with a source of electrical power.

In accordance with at least one set of examples, the power harvesting unit may comprise one or more rechargeable batteries, capacitors and/or super-capacitors for temporarily storing harvested energy for use in powering the motor mechanism at a later time. This may allow availability of a reliable supply of power for driving the motor mechanism even at times when there is an absence of source (i.e. luminous or NFC) stimuli.

As mentioned in the preceding section, a power harvesting unit enables motorised adjustment to be performed even in the absence of a mains electrical connection. This may be useful for instance in the case of initial installation or subsequent re-positioning, where mains power may not yet be connected or may be deliberately disconnected for reasons of safety. It may in any event be desirable to isolate adjustment circuits from the mains power supply in order for instance to prevent overloading the (typically low-power) motor circuits with the (typically high power) primary mains supply.

Also, absence of any mains connection to the optical arrangement may be desirable for reasons of simplifying the installation process. Since the optical arrangements do not require the presence of integrated light sources (unlike for example traditional troffer-based lighting units), no local power supply is required for driving a source of illumination. Providing a power harvesting unit or battery unit (for driving the motor mechanism) allows provision of a mains supply to be avoided. This obviates the need to run electric cabling to each of the optical arrangements, and hence renders installation quicker, simpler and cheaper.

In further examples, the reflector array and/or lens array may be configured for manual (i.e. direct physical) adjustment. This might be achieved by means of one or more further manual lever members for instance, to enable manual manipulation of the reflector and/or lens array. For example, the manual lever member(s) may be configured to engage with an elongate stick or the like in order to enable ground-based adjustment of the relative positioning of the two arrays, to therefore configure said second location.

Figure 3:
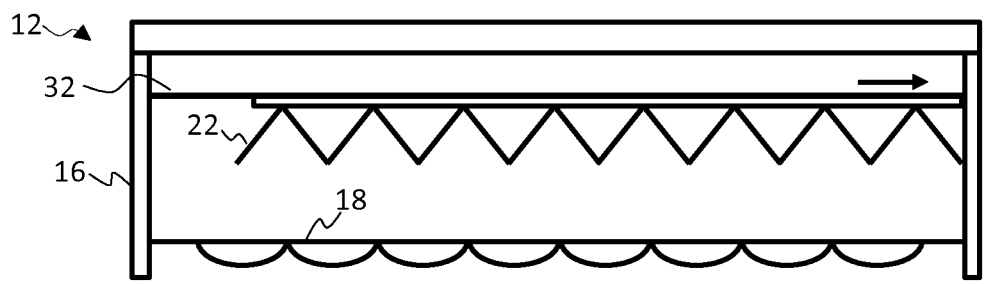
FIG. 3 shows a second adjustment setting of the reflector array of the first example optical arrangement.

Although in the particular example illustrated in FIGS. 1-3, the reflector array 22 is moveably mounted within the housing 16, in further alternative examples the lens array 18 may be moveably mounted. References in the above paragraphs to movement of the reflector array are to be understood as being equally applicable to arrangements in which the lens array is instead configured to be moveable in a similar manner in order thereby to achieve the same relative displacement between the two arrays.

In accordance with further examples, both the lens array 18 and the reflector array 22 might be moveably mounted, each configured to be movable in a different direction. In particular, one may be configured to be moveable along the x-direction (as illustrated in FIGS. 1-3), and the other may be configured to be moveable in the y-direction. This would provide two-dimensional freedom in adjustment of the lateral displacement between the lens array and the reflector array, helping to maximise the degree of control over the directionality of light transmitted from the arrangement 12.

In accordance with further examples still, at least one of the lens array 18 and the reflector array 22 may be mounted within the housing 16 in a manner so as to be moveable along a z-direction (along a direction perpendicular with respect to the plane described by the lens array). This is illustrated schematically in FIG. 4 which shows an example optical arrangement 12 in which the reflector array 22 is configured to be moveable along a z-directional axis with respect to the lens array. Two z-aligned rails 36, 38 are provided to facilitate this motion, wherein the reflector array 22 is coupled on either side to each of these rails. Motion may be driven by means of a motor mechanism as described above or by means of a manual control in further examples.

Z-directional adjustment may enable a focus of the output light to be adjusted, which may enable a quality or sharpness of the generated beam spot to be enhanced or configured.

Figure 4:
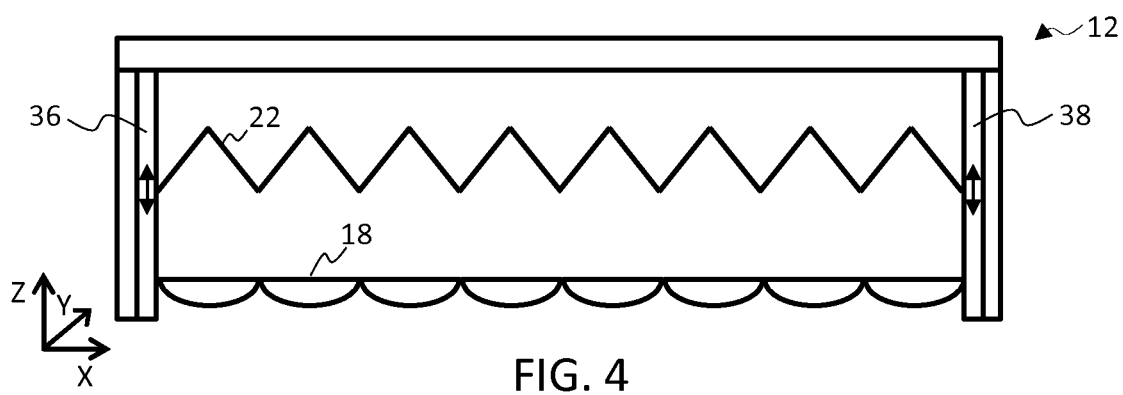
FIG. 4 schematically illustrates a third example optical arrangement in accordance with the invention.

For simplicity of illustration, the example optical arrangement in FIG. 4 shows only one of the two arrays 18, 22 being configured to be moveable within the housing, and only in a single direction. In further examples, this z-directed configurability might be combined with x and/or y directional configurability, as described in accordance with examples above. In particular, one of the two arrays might be moveable for instance in both an x and a z-direction, and the other may be moveable in a y-direction. In this way full three-dimensional control is achievable over the relative displacement of the two arrays. An alternative configuration might be that the lens array (or the reflector) is movable both in the x- and y-direction, and optionally the reflector (or the lens array) is movable in the z-direction.

Although in examples above, movement of the lens array 18 and/or the reflector array 22 are described and illustrated as being achieved by means of one or more rail mechanisms, in alternative examples, different mechanisms may be provided.

For example, flexure structures may be employed to facilitate linear X and/or Y motion. Flat leaf spring hinges might be used for instance to provide an X-Y flexural stage. An X-Y flexural stage typically consists of two separate sets of (typically two or more) flexures arranged at right angles to one another. At least one set typically extends between a base structure and an elevated platform, where compression of the flexures enables precise linear X and/or Y adjustments in the positioning of the elevated platform. By mounting the reflector array and/or lens array to this platform, and providing actuators to effect the necessary manipulations of the flexures, highly precise adjustments in the positioning of the said array(s) may be achieved in one or both of the X and Y directions.

Figure 5:
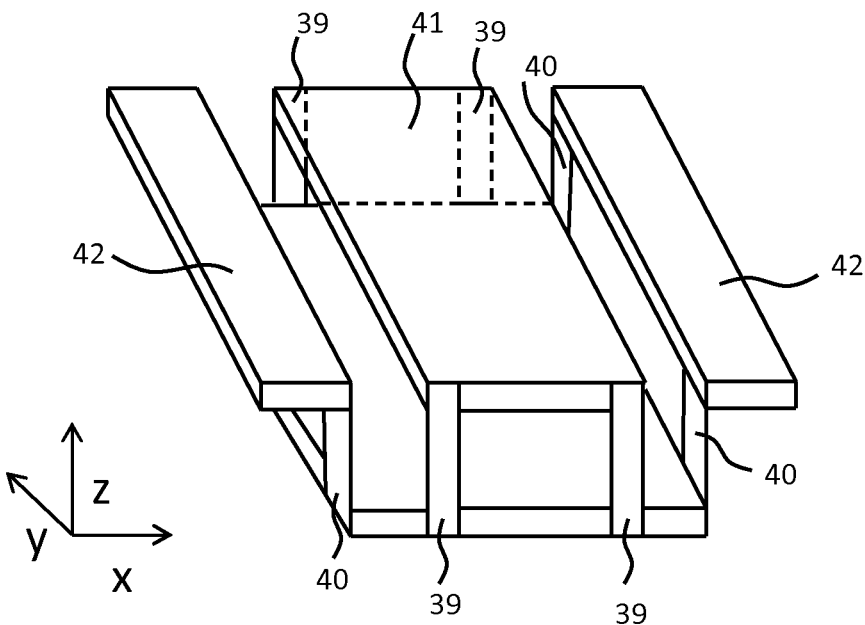
FIG. 5 schematically illustrates an example flexure-based hinge mechanism as may be incorporated in one or more embodiments of the invention.

An example flat leaf spring hinge is schematically illustrated in FIG. 5. For ease of description, an arbitrary set of X, Y, Z coordinate directions is illustrated in the figure. The hinge mechanism comprises a first set of flexures 39 extending between a base structure and a first mounting surface 41. The flexures are configured such that flexing or bending of this first set of flexures effects a displacement of the first mounting surface in the y-direction. By mounting or coupling components to the first mounting surface therefore, and suitably manipulating the first set of flexures, translation in a y-direction can be achieved.

The hinge mechanism further comprises a second set of flexures 40, extending between a base structure and a second mounting surface 42. Flexing or bending of the second set of flexures effects a displacement of the second mounting surface in the x-direction. By mounting or coupling components to the second mounting surface therefore, and suitably manipulating the second set of flexures, translation in an x-direction can thus be achieved.

The leaf spring hinge of FIG. 5 hence provides one example of a flexure-based adjustment mechanism which may be implemented in examples of the invention to enable x-y adjustment of the lens array 18 and/or the reflector array 22 within the lighting device 12. However, it should be understood that the leaf spring hinge is shown as a mere example of such a flexure-based adjustment mechanism and that many other suitable types of a flexure-based adjustment mechanisms exist, as will be immediately apparent to the skilled person.

Moreover, it should be understood that flexure structures provide just one example of such an alternative adjustment mechanism. In further examples, any other suitable actuation or mechatronic component or system capable of facilitating substantially linear motional adjustments of the position of one or both of the lens array or reflector array may be considered.

The optical operation of the optical arrangement 12 will now be described in detail.

In operation, light is received at the optical arrangement 12, typically at some oblique angle, and enters the arrangement through one or more of the lenses 20 of the lens array 18. Light entering through each lens 20 is directed onto a respective one (or more) of the reflector elements 24 (depending upon the relative lateral configuration of the reflector array and lens array), from where it is reflected back to the same or a different lens of the lens array along a laterally displaced path. This light is then transmitted through said lens and optically processed such that it emerges from the optical apparatus at an angle different to the angle from which the light was originally received. By changing the relative displacement of the reflector array and lens array, the degree of the angular shift between the incoming and outgoing light may be adjusted.

Figure 6:
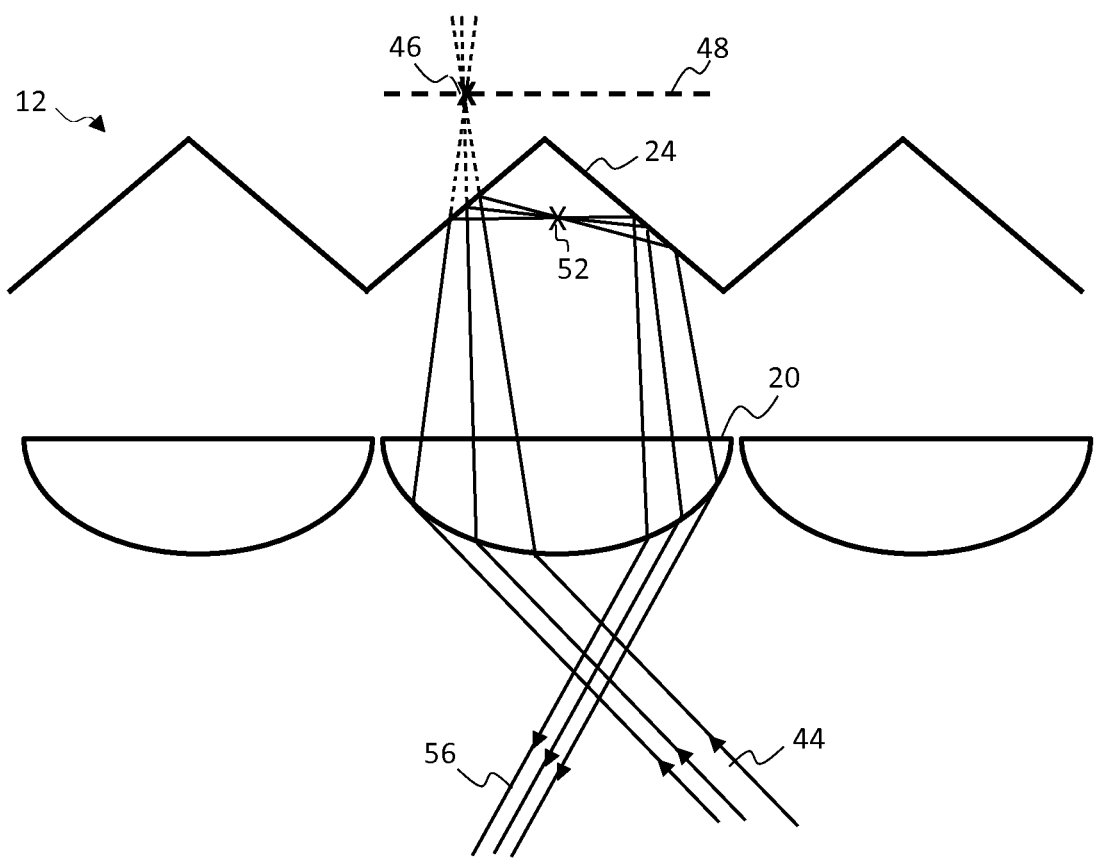
FIG. 6 schematically illustrates the optical structure of an example optical arrangement in accordance with the invention.

The optical structure of the arrangement 12 is illustrated in more detail in FIG. 6 which schematically illustrates a close-up cross-sectional view of a subset of three reflector elements 24 and three opposing lenses 20. As shown, in the present example, each of the reflector elements 24 comprises a corner-type reflector formed of a pair of reflective surfaces which meet concavely at a point. The figure is schematic, and shows only a two-dimensional cross-section through the reflector array 22. In preferred examples, the reflective surfaces of each reflector element 24 may meet at an angle of approximately or, preferably, exactly 90°. In such cases, the corner reflector provides a retro-reflector, adapted to reflect incident light along a direction parallel but laterally shifted to the direction of incidence A corner reflector in accordance with this example may be formed, for example, of a suitable mirror-grade aluminium (.e.g. "Alanod" or similar), or of glass having a reflective coating (e.g. an interference coating, such as is provided for car mirrors; or a reflective aluminium coating, optionally further comprising a protective transparent over-layer); or a suitable plastic being provided with a reflective coating (e.g. PMMA). It is emphasised that these are listed by way of non-limiting examples only, and in further examples any other suitable materials as might be apparent to the skilled person may alternatively be employed.

Other kinds of reflector may be considered, for example TIR-based reflectors, including TIR corner-type reflectors, comprising corner cube structures formed or embedded within the body of a transmissive optical body. In the case of TIR based reflection, the focus length of the lenses 20 combined with the refractive index of the transmissive optical body should be provided large enough such that TIR is achievable for the full received input beam. However, this notwithstanding, the system in general should ideally operate within the parameter envelope where vignetting losses are acceptable, e.g. minimised.

A TIR-based reflector may comprise an optical body (e.g. an optical plate or layer) having said corner cube structures embedded or formed therein.

Suitable materials for the optical body include for example glass or an optical grade polymer material such as for instance polycarbonate, Poly(methyl methacrylate) (PMMA), or any other light-transmissive plastic. These may optionally be provided with an anti-reflection coating across a light entry surface.

In further examples, any other suitable reflector type or structure may also be considered.

Each of the lenses 20 for the purposes of the present example is shown as a plano-convex lens, i.e. having a planar surface opposing a convex surface. However, in further examples other lens types and configurations might be used, for example bi-convex lenses or magnifying lenses. In certain examples, Fresnel lenses might be employed. These are generally less expensive that other kinds of lens and so may confer a cost saving on manufacture of the optical arrangement.

Where a plano-convex lens is used, it may be preferable to orient the lenses with the planar surface facing the reflector elements, and the convex surface facing outwards from the arrangement.

Suitable materials for the lenses of the lens array include for example, glass, silicone, or an optical-grade polymer such as PMMA or polycarbonate.

In accordance with at least one set of examples, the lenses of the lens array may be joined or mounted together by an interconnecting matrix material so as to form a single body. The interconnecting matrix material might be an optical material, where this may be the same material as is comprised by the lenses, or may be a different optical material.

Examples of suitable materials for the interconnecting matrix include for example glass, polycarbonate, PMMA, or any other suitable optical grade polymer material.

A lens array of this form may comprise a base substrate or matrix onto which is laminated an (embossed) foil comprising an array of lenses. These may be Fresnel lenses in particular examples.

Alternatively, the structure may be formed by means of an embossing (hot-pressing) process.

The lens array 22 may comprise a lenticular array. In particular examples, a lenticular array may be formed by means of layering a base substrate or matrix with a UV-cured lacquer.

Alternatively again, a lens array may be formed by means of layering a base substrate or matrix with silicone by thermal or chemical hardening. This process is well known for instance in the field of LED production.

In accordance with alternative examples, the lens array may be an integrally formed optical body, i.e. formed as a single unitary optical piece. This may be achieved for example by means of a hot-pressing or hot-embossing process wherein a single optical layer is pressed so as to shape or mould it into the required lens array structure.

In further examples, the plurality of lenses populating the array 22 may not be joined by any interconnecting material, but might instead be held in position relative to one another by means of a substrate or interconnecting frame. This may reduce the weight of the arrangement and may also reduce manufacturing cost by limiting the quantity of optical (or other) material required.

By way of illustration, an example (approximately collimated) input beam 44 is shown in FIG. 6 approaching the optical arrangement 12, originating from a light source located at a position remote from the optical arrangement. The input beam falls incident at the centrally shown lens 20 at an oblique angle. The rays of the beam are refracted as they enter the lens in such a way as to direct them into a converging beam which exits the lens and converges toward a focus point 46 located in a focal plane 48 of the lens which is positioned behind the reflector array, proximal to the central reflector element 24.

Before the rays are able to reach the natural focus point 46, the beam is intercepted by a first reflective surface of the central reflector element 24. The rays are then reflected from this first reflective surface along a set of reflection paths toward a second reflective surface of the reflector element. The reflection paths converge part way between the two reflective surfaces at a reflection focus point 52. The rays diverge from this reflection focus point and fall incident at the second reflective surface, from which they are then reflected along a second set of slightly divergent reflection paths in the direction of the central lens 20.

These slightly divergent rays then re-enter the central lens 20 through a set of entry points laterally displaced with respect to those through which they exited the lens on the other side. The lens then refracts these incoming rays in such a way as to direct them into an exit beam 56 which exits the lens 20 travelling in a direction angularly shifted with respect to the input beam 44.

As illustrated in this example, the effect of each reflector element 24 is effectively to reflect received light along a path parallel but laterally shifted with respect to the path of incidence. When this laterally shifted light is received back into the lens 20, it is re-processed to form a (for example approximately collimated) beam having a shifted angular direction of propagation.

Figure 7:
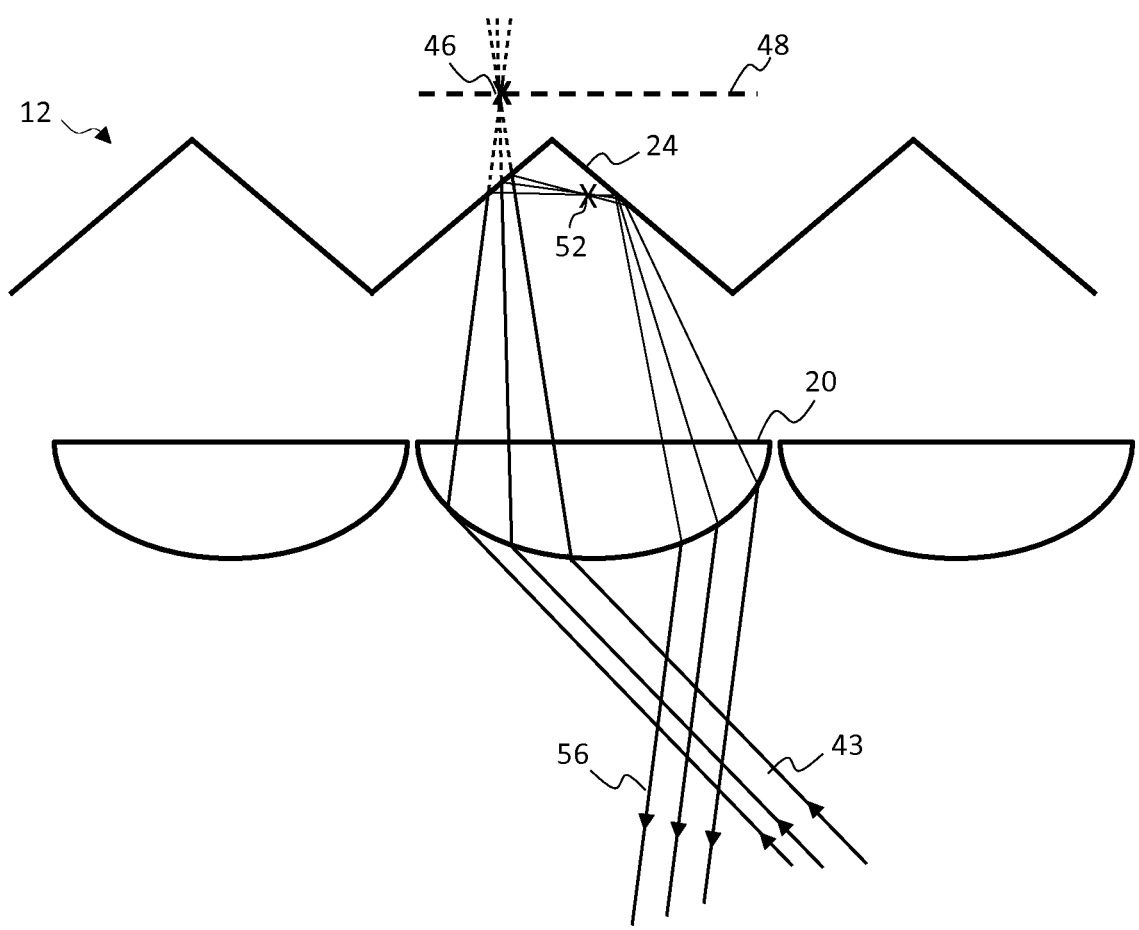
FIG. 7 schematically illustrates the optical structure of an example optical arrangement in which the reflector array has been laterally displaced with respect to the lens array.

By shifting the relative lateral displacement of the reflector array and lens array, the angular shift or change between the incoming 44 and outgoing 56 beams may be adjusted. This is illustrated schematically in FIG. 7 which shows the ray paths for an example optical arrangement in which the reflector array 22 has been laterally displaced with respect to the lens array 18. In particular, the lens array has been shifted very slightly in a 'leftward' direction (from the perspective of FIG. 7). As illustrated in the figure, even this small shift has a significant effect on the resultant propagation angle of the output beam 56. In particular, the output beam 56 in this shifted arrangement has a shallower propagation angle with respect to the (normal) optical axis of the lens 20. The incoming angle of the input beam 44 remains unchanged; the achieved angular shift in the outgoing beam is realised entirely through the re-positioning of the reflector array. Hence, significant adjustments in the output beam angle can be achieved in embodiments of the invention, without the need to reposition the source of the incoming light beams 44.

As discussed, small relative lateral displacements between the lens array 18 and reflector array 22 can realise large shifts in the outgoing beam angle. Indeed, as also discussed above, lateral adjustments which are too large can result in significant 'lost light' as light is reflected from the reflector elements onto unwanted locations, such as onto neighbouring lenses. The effect of the invention is maximised in embodiments in which reflected light re-enters the same lens from which it exited. Reflected light which is directed onto neighbouring lenses cannot form a part of the shifted beam and may even interfere with the overall optical effect of the device (for example reducing beam sharpness), i.e. vignetting.

As mentioned above, this vignetting effect may be mitigated in some examples, through employment of one or more baffles positioned for example in-between each lens, aligned perpendicularly with respect to the plane of the lens array. These may block stray light and prevent reflected light from falling incident at a lens which is different from the one which it originally exited.

The baffles or blocking members may for example extend the entire way between the lens array 18 and the reflector array 22, or may extend only part way.

Figure 8:
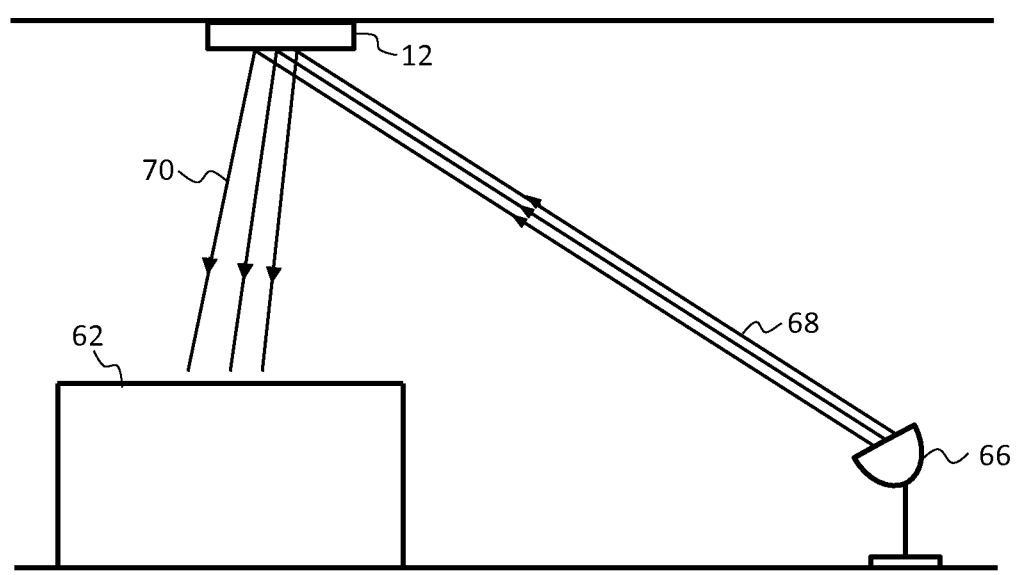
FIG. 8 schematically illustrates an example lighting system in accordance with an aspect of the invention.

Operation of the optical arrangement 12 in situ is illustrated in FIG. 8, wherein the optical arrangement 12 is shown as part of an optical system configured to provide illumination to a particular region in a space. As shown, the optical arrangement is provided mounted to a ceiling of the space in question, at a point approximately aligned with an example workstation 62 to be illuminated. A luminaire 66 is positioned at a point on the ground of the example space, laterally displaced with respect to the optical arrangement 12 and the example workstation 68.

The luminaire 66 is configured to project a light output 68 onto the optical arrangement 12, and the optical arrangement is configured to reflect and re-direct the received optical output back along a propagation path 70 angularly displaced with respect to incoming path 68. A relative displacement between the lens array and the reflector array within the optical arrangement is adjusted so as to ensure that the outgoing beam 70 is directed in the direction of the example workstation 62.

Should the position of either the luminaire 66 or the workstation 62 change, the optical arrangement 12 might be reconfigured so as to change the angular displacement between the incoming 68 and outgoing beams 70 and thereby ensure that outgoing light remains projected in the direction of the example workstation, e.g. desk.

The projected light spot generated on the workstation 62 surface by the outgoing beam 70 may typically be of a similar or identical size to the light-emitting area of the luminaire light source 66. It typically cannot be smaller than the light emitting area of the light source within the luminaire due to etendue considerations.

In some cases, it may be desirable to adjust the size of the generated output light spot, for example so as to direct light across a larger area within the space. Rather than a focussed spot-beam, a user may instead desire a more widely dispersed beam, covering for instance the entirety of their desk or workstation, rather than just a narrow area.

This may be achieved in examples of the invention in a number of different ways. In accordance with some examples, the size of the 'effective' light-emitting area may be increased, either through using a larger light source, or by means of one or more optical components. Optical components may be provided locally to the light source, adapted to increase the effective light-emitting area, including for example one or more variable diffusers.

Additionally or alternatively, one or more optical components may be provided positioned within or about the optical arrangement itself for increasing the effective light emitting area. This may in examples include for example a diffuser-type structure, positioned either between the lens array 18 and the reflector array 22, or in front of the lens array (for instance, extending across the light entry surface of the lens array 18). Any diffuser-type structure may preferably be a refractive, rather than reflective, diffusing structure.

In further examples, the effective light emitting area of the luminaire 66 may be increased by de-focussing the source light. This may be achieved in examples through use of a zoom lens mounted to the luminaire, and adjusted to change a focus point of plane of the outgoing light beam 68. Alternatively, the focus may be shifted through re-configurations of the optical arrangement 12, for example by changing a displacement of the lens array 18 and the reflector array 22 in a direction perpendicular to a plane of the lens array (or reflector array).

In further examples, the lighting system may incorporate a plurality of the optical arrangements and/or a plurality of luminaires. This may enable light to be provided to a plurality of different locations, and also may enable elimination of any hard shadows occurring outside of, or at the boundary of, individual beams.

In accordance with any embodiment of the optical arrangement 12, the arrangement might be constructed having a form factor similar to or matching the standard dimensions of ceiling tiles used in modular ceiling systems. This would enable easy installation of the arrangements into modular ceiling systems.

As noted above, adjustment of the lens array 18 and/or the reflector array 22 may be achieved in examples by means of a suitable motor mechanism. User control of the motor mechanism in order to achieve desired configurations of the optical arrangement may be implemented in a number of ways.

There may further be provided in the optical arrangement an interface unit for receiving control commands, and controlling the motor mechanism accordingly. The interface unit may in examples be configured to receive wireless control commands. It may in examples be configured to receive said commands via a Wi-Fi communication link, or via any other suitable wireless communication link, such as for instance Bluetooth, NFC, RF transmission, ZigBee or Z-wave.

In examples, control commands might be issued or transmitted by means of an associated app configured to run for instance on a user or operator mobile device (such as a smartphone or tablet). The app might enable a plurality of the optical arrangements to be controlled at once.

In further examples, user control of the motor mechanism may be achieved by means of more simplistic control regimes, for example use of a laser pointer directed toward a further provided light sensor installed within the optical arrangement. Coded light transmitted from one or more luminaires 66 might also in examples be used as a control signal for controlling configuration of the optical arrangement. These might also be received by means of one or more further provided light sensors.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An optical arrangement for illuminating a region in a space, comprising:

a lens array comprising a plurality of lenses;

a reflector array comprising a plurality of reflector elements;

wherein each lens is arranged to direct light originating from a light source at a first location within said space onto one of said reflector elements, and each reflector element is arranged to reflect received light back onto the same lens from which it was received for redirection toward a different second location within said space, wherein at least one of the lens array and the reflector array has an adjustable position so as to configure said second location, wherein each of the plurality of reflector elements has a first surface portion and a second surface portion arranged such that light incident on the first surface portion from one of the lenses is reflected towards the second surface portion, with the second surface portion arranged to reflect the light received from the first surface portion towards said same lens from which the first surface portion received the light, and/or wherein one or more of the reflector elements is adapted to reflect incident light in a direction parallel but non-coincident with a direction of incidence.

2. An optical arrangement as claimed in claim 1, wherein a pitch of the lens array is equal to a pitch of the reflector array.

3. An optical arrangement as claimed in claim 1, wherein each of the plurality of lenses is adapted to converge received light toward one of the reflector elements.

4. An optical arrangement as claimed in claim 1, wherein each of the lens array and the reflector array has an adjustable position, and wherein each is adjustable by means of movement in a respectively different direction.

5. An optical arrangement as claimed in claim 4, wherein the lens array describes a plane, and wherein the lens array and reflector array are each adjustable in a different orthogonal direction parallel with said plane.

6. An optical arrangement as claimed in claim 1, wherein the lens array describes a plane, and wherein one of the lens array and reflector array is adjustable in a direction perpendicular to said plane.

7. An optical arrangement as claimed in claim 1, wherein the lens array is an integrally formed optical body.

8. An optical arrangement as claimed in claim 1, wherein the reflector elements are corner reflectors; and/or wherein the reflector array is an integrally formed body and comprises at least one of: a metallic mirror, a dielectric mirror, and a total internal reflection-based mirror.

9. An optical arrangement as claimed in claim 1, further comprising a motor mechanism for driving adjustment of the position of at least one of the lens array and the reflector array.

10. An optical arrangement as claimed in claim 9, wherein the arrangement comprises a power harvesting unit for providing electrical power to said motor mechanism.

11. An optical arrangement as claimed in claim 9, wherein the arrangement comprises an interface unit operatively coupled with said motor mechanism for receiving control commands for configuring adjustment of the lens array and/or the reflector array.

12. A lighting system for illuminating a region in a space, comprising:

a luminaire to be positioned at a first location within the space, adapted to generate a light output; and an optical arrangement as claimed in claim 1, to be positioned remotely from the luminaire, and arranged to receive said light output and to redirect it toward a second location within the space.

13. A lighting system as claimed in claim 12 wherein the luminaire comprises a zoom lens for adjusting a focus of the luminous output.

14. A method of providing illumination to a region within a space, comprising:

directing light from a first location within the space toward a remotely positioned optical arrangement, the arrangement comprising:

a lens array comprising a plurality of lenses;

a reflector array comprising a plurality of reflector elements;

wherein each lens is arranged to direct light received from the first location within said space onto one of said reflector elements, and each reflector element is arranged to reflect received light back onto the same lens from which it was received for re-direction toward a second different location within said space, wherein at least one of the lens array and the reflector array has an adjustable position, wherein each of the plurality of reflector elements has a first surface portion and a second surface portion arranged such that light incident on the first surface portion from one of the lenses is reflected towards the second surface portion, with the second surface portion arranged to reflect the light received from the first surface portion towards said same lens from which the first surface portion received the light, and/or wherein one or more of the reflector elements is adapted to reflect incident light in a direction parallel but non-coincident with a direction of incidence;

and the method further comprising:

adjusting the position of the at least one of the lens array and the reflector array so as to configure said second location.

\* \* \* \* \*